United States Patent Office 2,707,196
Patented Apr. 26, 1955

2,707,196

OPEN CHAIN ANALOGS OF BENZENE AND METHODS OF PREPARATION

Gilbert Forrest Woods, Silver Spring, Md.

No Drawing. Application September 28, 1949, Serial No. 118,454

5 Claims. (Cl. 260—638)

This invention relates to open chain analogs of benzene and methods of preparation thereof.

More particularly, this invention relates to the preparation of open chain analogs of benzene such as chain hydrocarbons of the conjugated polyene type and similar compounds derived from 2,4-pentadienal, the reactions preferably being carried out in the presence of one or more catalysts to form conjugated polyenes such as for example, 1,3,7-octatrien-5-ol (allyl butadiene carbinol); 1,3,5-hexatriene (vinyl butadiene); or 1,3,5,7-octatetraene (dibutadienyl).

Heretofore, compounds of the foregoing type are reported to have been prepared by pyrolysis of s-divinylglycol diformate, by condensation of allyl chloride with sodamide, by phthalic anhydride dehydration of 1,3-hexadien-5-ol and by debromination of 3,4-dibromohexadiene-1,5 with zinc. It has been found that good yields of the pure form of 1,3,5-hexatriene and 1,3,5,7-octatetraene may be obtained by a stepwise reaction in which 2,4-pentadienal is treated with a Grignard reagent to yield butadiene carbinol as an intermediate, which is further reacted with a dehydrating agent such as activated alumina to produce the desired open chain analog of benzene.

The compounds produced according to the teachings of the present invention exhibit unusual physical and physiochemical properties, the products being characterized, among other things, by rapid polymerization on standing, however, they are comparatively stable in cool petroleum ether solutions. Some of the products produced according to this invention may find utility in the preparation of pharmaceutical products. It is also possible to produce from these compounds extremely long chain polymers thereof having many of the characteristics possessed by the butadienes and similar synthetic elastomers.

The methods of preparation of the compounds of the present invention are described in detail in the "Journal of the American Chemical Society," vol. 70, page 3394 (1948) and vol. 71, page 1396 (1949). For purposes of illustrating the invention, the methods employed for the preparation of the compounds of the present invention are set forth in the following examples.

EXAMPLE I

*1,3,5-hexatriene*

33.5 grams of 2,4-pentadienal in 50 ml. of anhydrous ether are added slowly to an etheral solution of methylmagnesium bromide from 15 grams of magnesium and 58 grams of methyl bromide. The Grignard addition complex is decomposed with aqueous ammonium chloride. The ether layer is separated, washed with water, and dried over magnesium sulfate. After removal of the drying agent, the solution is distilled under reduced pressure to obtain 1,3-hexadien-5-ol. 35.8 grams of this compound are catalytically dehydrated in a stream of nitrogen under reduced pressure of 0.1 mm. over 8 to 12 mesh alumina at 325–350° C. The reaction products are condensed in two traps cooled in Dry Ice baths, and on warming the solid condensate liquefies. The water layer is partially removed with a dropper and the remaining mixture is dried with calcium oxide. Distillation of this material at atmospheric pressure in a nitrogen atmosphere in the presence of calcium oxide yields 1,3,5-hexatriene of the formula:

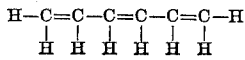

The 1,3,5-hexatriene thus produced may be further purified by fractional crystallization in a Dry Ice-acetone bath until a constant freezing point of −11.7° C. is manifested.

EXAMPLE II

*1,3,5,7-octatetraene*

An etheral solution of allylmagnesium bromide is prepared from 80 grams of allyl bromide and 45 grams of powdered magnesium in 600 ml. of anhydrous ether using the procedure described by Gilman et al. in Bull. Soc. Chim., vol. 43, page 1322 (1928). The ether solution of allylmagnesium bromide is then pumped with nitrogen away from the excess magnesium powder. To this chilled solution is added 41 grams of 2,4-pentadienal dissolved in 100 ml. of anhydrous ether. The mixture is stirred for an additional 15 minutes at room temperature. The Grignard addition complex thus formed is decomposed with a saturated aqueous solution of ammonium chloride and the ether layer separated, washed with water and sodium bicarbonate solution, and dried under magnesium sulfate. After removal of the ether under reduced pressure, the 1,3,7-octatrien-5-ol thus produced is distilled in a nitrogen atmosphere.

The 1,3,7-octatrien-5-ol thus obtained is distilled under a reduced pressure in a nitrogen atmosphere through a column filled with 8 to 12 mesh activated alumina and heated to a temperature of 250–280° C. Two connected receivers are used, one cooled with an ice-calcium chloride bath and the other with an acetone-Dry Ice bath. The products solidify in the receiver, but upon warming the material melts and most of the water layer is withdrawn. The residual material is dried over calcium oxide and crystallized from low boiling petroleum ether in a nitrogen atmosphere. This compound may be illustrated by the formula:

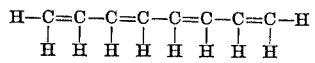

This procedure yields 11 grams of octatetraene from 22 grams of 1,3,7-octatrien-5-ol.

In much the same manner as described in Example I, the Diels-Alder reaction of octatetraene is carried out by treating 2.5 grams of octatetraene with 5 grams of maleic anhydride in the presence of 50 ml. of benzene. The mixture is heated under reflux in a nitrogen atmosphere on a steam bath for six hours. A copious white solid precipitate is thrown down as the reaction proceeds.

The foregoing reaction of octatetraene may also have possibilities in the pharmaceutical field.

The compound exhibits many of the same characteristics as those possessed by the compound described in Example I, but if polymerization takes place too rapidly the material decomposes under the generated heat somewhat less violently than an explosion.

In lieu of the Grignard reagents described in connection with the foregoing examples, it is possible to use analogs of such reagents including the alkylmagnesium halides having from 1 to 5 carbon atoms in the alkyl radical, the halide may be the bromide, the iodide or the chloride. In lieu of the activated alumina catalyst, other suitable catalysts may be used, although activated alumina has proved to be the most desirable catalyst for this purpose.

It is intended that the patent shall cover by suitable expression in the appended claims the features of patentable novelty which reside in the invention.

I claim:

1. The method of producing open chain analogs of benzene of the conjugated polyene type comprising the steps of reacting 2,4-pentadienal with a Grignard reagent having a hydrocarbon radical selected from the group consisting of alkyl and allyl to produce an unsaturated alcohol having a hydrocarbon radical corresponding to the hydrocarbon radical of the Grignard reagent, and catalytically dehydrating the alcohol thus produced in the presence of activated alumina to the corresponding unsaturated hydrocarbon.

2. The method of obtaining 1,3,5-hexatriene comprising the steps of reacting 2,4-pentadienal with methylmagnesium halide to produce 1,3-hexadien-5-ol, and catalytically dehydrating said 1,3-hexadien-5-ol in the presence of activated alumina.

3. The method of preparing 1,3,5,7-octatetraene comprising reacting 2,4-pentadienal with allylmagnesium halide to produce 1,3,7-octatrien-5-ol, and catalytically dehydrating said 1,3,7-octatrien-5-ol in the presence of activated alumina whereby 1,3,5,7-octatetraene is formed.

4. The method of preparing a series of butadiene carbinols comprising reacting 2,4-pentadienal with an alkyl magnesium halide.

5. 1,3,5,7-octatetraene.

References Cited in the file of this patent

UNITED STATES PATENTS 2,429,411   Jones et al. _____ Oct. 21, 1947

OTHER REFERENCES

Coulson, J. Chem. Phys. (Royal), vol. 7, pp. 1069–71 (1939).

Woods et al., J. A. C. S., vol. 70, p. 3394 (1948).

Faraday, "Encycl. of Hydrocarbon Compounds," Hexatriene (1,3,5) F 400, Sheet 1, Chemindex Ltd., Manchester, England.